United States Patent
Gilbert et al.

(10) Patent No.: US 9,484,019 B2
(45) Date of Patent: Nov. 1, 2016

(54) SYSTEM AND METHOD FOR DISCRIMINATIVE PRONUNCIATION MODELING FOR VOICE SEARCH

(71) Applicant: AT&T Intellectual Property I, L.P., Reno, NV (US)

(72) Inventors: Mazin Gilbert, Warren, NJ (US); Alistair D. Conkie, Morristown, NJ (US); Andrej Ljolje, Morris Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 321 days.

(21) Appl. No.: 13/649,680

(22) Filed: Oct. 11, 2012

(65) Prior Publication Data

US 2013/0035939 A1 Feb. 7, 2013

Related U.S. Application Data

(63) Continuation of application No. 12/274,025, filed on Nov. 19, 2008, now Pat. No. 8,296,141.

(51) Int. Cl.
*G10L 15/26* (2006.01)
*G10L 15/06* (2013.01)
*G10L 15/187* (2013.01)
*G10L 15/02* (2006.01)

(52) U.S. Cl.
CPC ........... *G10L 15/063* (2013.01); *G10L 15/187* (2013.01); *G10L 2015/025* (2013.01)

(58) Field of Classification Search
CPC . G10L 15/183; G10L 15/193; G10L 15/187; G10L 13/08

USPC ....... 704/254, 243, 255, 240, 257, 231, 256, 704/256.2, 244, 251, 236, 235; 379/88.01–88.04; 434/185
See application file for complete search history.

(56) References Cited

U.S. PATENT DOCUMENTS

| | | | | |
|---|---|---|---|---|
| 5,317,673 A | * | 5/1994 | Cohen et al. | 704/232 |
| 5,390,278 A | * | 2/1995 | Gupta et al. | 704/243 |
| 5,625,749 A | * | 4/1997 | Goldenthal et al. | 704/254 |
| 5,937,384 A | * | 8/1999 | Huang et al. | 704/256 |
| 6,076,053 A | | 6/2000 | Juang et al. | |
| 6,151,575 A | * | 11/2000 | Newman et al. | 704/260 |
| 6,272,464 B1 | | 8/2001 | Kiraz et al. | |
| 6,330,538 B1 | * | 12/2001 | Breen | 704/260 |
| 6,389,394 B1 | | 5/2002 | Fanty | |
| 6,434,521 B1 | | 8/2002 | Barnard | |

(Continued)

*Primary Examiner* — Vijay B Chawan

(57) ABSTRACT

Disclosed herein is a method for speech recognition. The method includes receiving speech utterances, assigning a pronunciation weight to each unit of speech in the speech utterances, each respective pronunciation weight being normalized at a unit of speech level to sum to 1, for each received speech utterance, optimizing the pronunciation weight by identifying word and phone alignments and corresponding likelihood scores, and discriminatively adapting the pronunciation weight to minimize classification errors, and recognizing additional received speech utterances using the optimized pronunciation weights. A unit of speech can be a sentence, a word, a context-dependent phone, a context-independent phone, or a syllable. The method can further include discriminatively adapting pronunciation weights based on an objective function. The objective function can be maximum mutual information, maximum likelihood training, minimum classification error training, or other functions known to those of skill in the art.

20 Claims, 4 Drawing Sheets

(56) References Cited

U.S. PATENT DOCUMENTS

| | | |
|---|---|---|
| 6,574,597 B1* | 6/2003 | Mohri et al. ............... 704/251 |
| 7,181,395 B1 | 2/2007 | Deligne et al. |
| 7,216,079 B1 | 5/2007 | Barnard et al. |
| 7,219,059 B2* | 5/2007 | Gupta et al. ............... 704/240 |
| 7,467,087 B1 | 12/2008 | Gillick et al. |
| 8,457,959 B2* | 6/2013 | Kaiser ............... 704/231 |
| 2002/0064257 A1 | 5/2002 | Denenberg et al. |
| 2002/0111805 A1 | 8/2002 | Goronzy et al. |
| 2002/0128820 A1 | 9/2002 | Goronzy et al. |
| 2002/0138265 A1* | 9/2002 | Stevens et al. ............... 704/251 |
| 2003/0069729 A1 | 4/2003 | Bickley et al. |
| 2005/0049868 A1 | 3/2005 | Busayapongchai |
| 2005/0119885 A1 | 6/2005 | Axelrod et al. |
| 2006/0015341 A1* | 1/2006 | Baker ............... 704/255 |
| 2006/0149558 A1 | 7/2006 | Kahn et al. |
| 2007/0033044 A1* | 2/2007 | Yao ............... 704/256.3 |
| 2008/0010065 A1* | 1/2008 | Bratt et al. ............... 704/246 |
| 2008/0221893 A1* | 9/2008 | Kaiser ............... 704/257 |
| 2008/0235025 A1* | 9/2008 | Murase ............... G10L 13/033 704/260 |
| 2009/0119105 A1 | 5/2009 | Kim et al. |

* cited by examiner

SYSTEM AND METHOD FOR DISCRIMINATIVE PRONUNCIATION MODELING FOR VOICE SEARCH

PRIORITY INFORMATION

The present application is a continuation of U.S. patent application Ser. No. 12/274,025, filed Nov. 19, 2008, the contents of which are incorporated herein in their entirety.

BACKGROUND OF THE INVENTION

1. Field of the Invention

The present invention relates to speech recognition and more specifically to automatic pronunciation modeling for speech recognition.

2. Introduction

Accurate pronunciation modeling is an important part of successful voice search applications. A typical voice search application, such as a corporate telephone directory or a yellow pages search, involves speech recognition of a list of named entities such as people, businesses, cities, movies, music, etc. Although speech recognition technology has matured significantly over the past decade, the variations in pronunciation of named entities among different individuals pose a tremendous challenge for speech recognition systems. As a result, most voice search applications depend on expensive human experts to listen to examples of different pronunciations and tune speech recognition systems manually. This process is not only laborious, slow, and expensive, but also impractical due to unavailability of consistent audio data for each named entity. Currently no stochastic methods have been demonstrated to work automatically and successfully.

In addition, although human experts can carefully craft name pronunciations, the resultant baseforms do not necessarily work well for automatic speech recognition systems. What humans recognize well is not necessarily easy for machines to recognize. Accordingly, what is needed in the art is an improved way to generate pronunciation models for use with speech recognition.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and tangible computer readable-media for speech recognition. The method includes receiving speech utterances, assigning a pronunciation weight to each unit of speech in the speech utterances, each respective pronunciation weight being normalized at a unit of speech level to sum to 1. For each received speech utterance, the method includes optimizing the pronunciation weight by (1) identifying word and phone alignments and corresponding likelihood scores, and (2) discriminatively adapting the pronunciation weight to minimize classification errors, and recognizing additional received speech utterances using the optimized pronunciation weights. A unit of speech can be a sentence, a word, a context-dependent phone, a context-independent phone, or a syllable. The method can further include discriminatively adapting pronunciation weights based on an objective function. The objective function can be maximum mutual information (MMI), maximum likelihood (MLE) training, minimum classification error (MCE) training, or others. Speech utterances can be names. The speech utterances can be received as part of a multimodal input or search. The step of discriminatively adapting pronunciation weights can further include stochastically modeling pronunciations.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
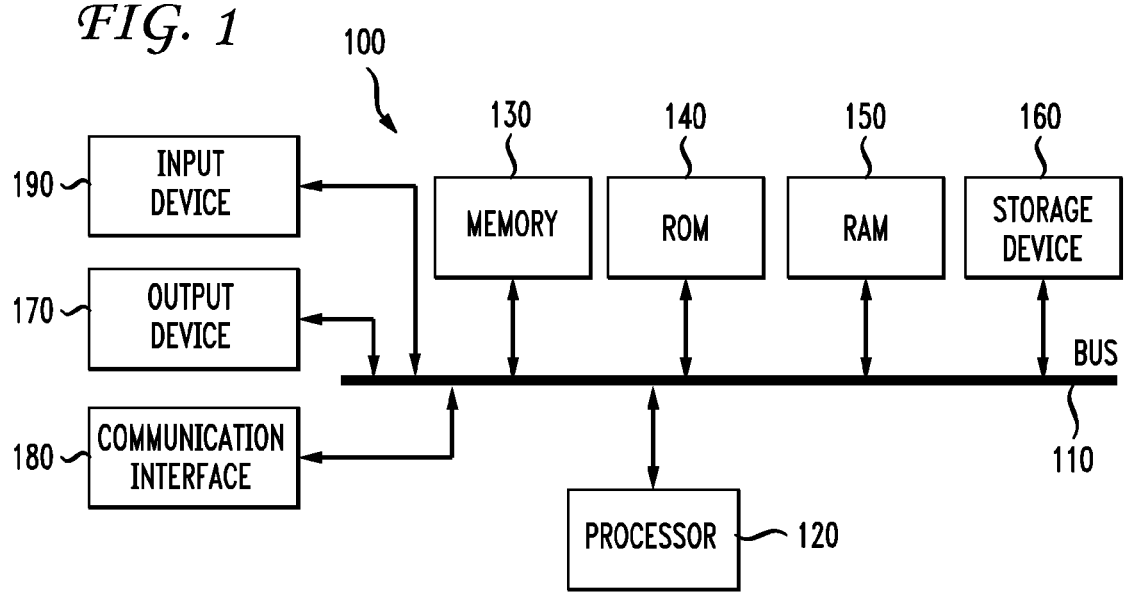
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
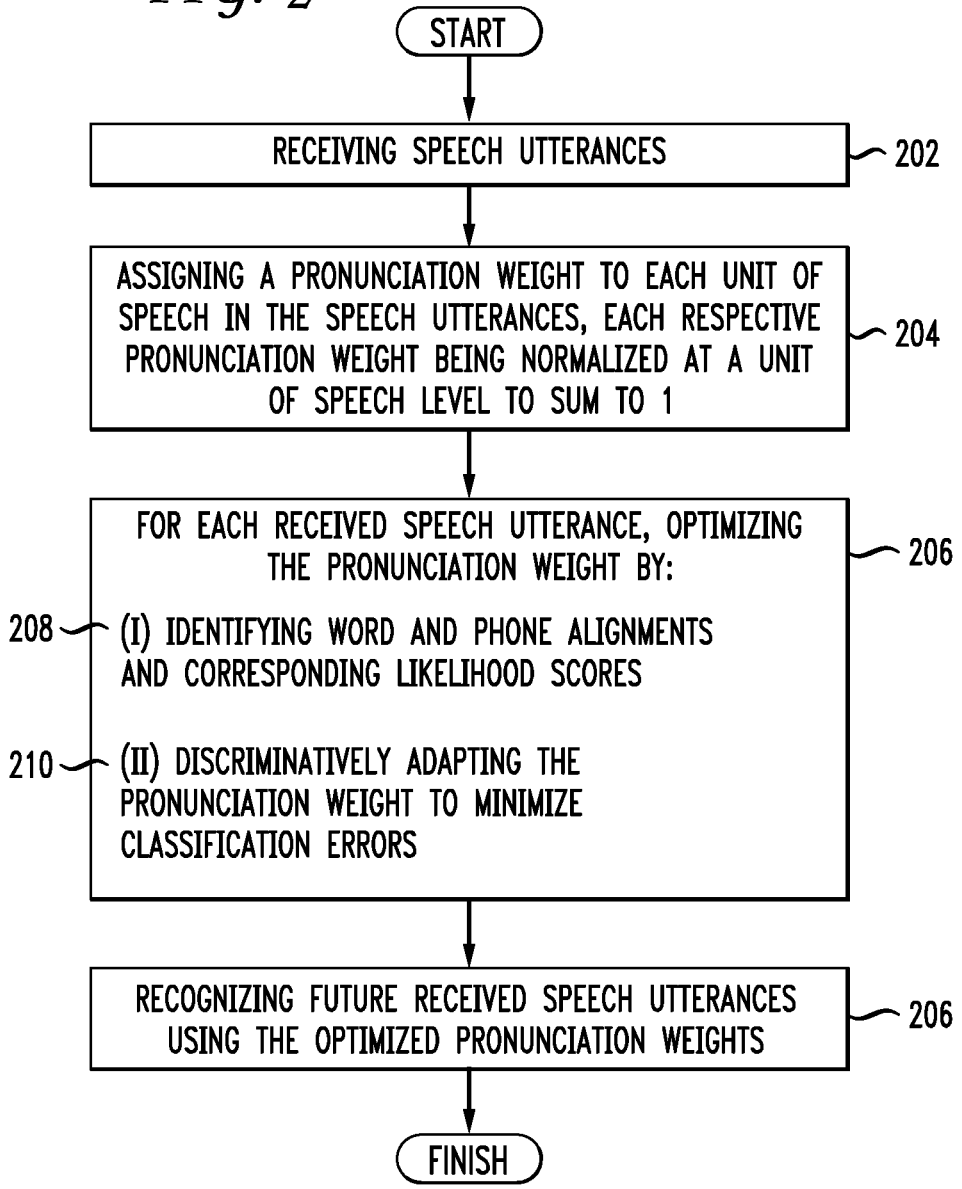
FIG. 2 illustrates an example method embodiment.

Having disclosed some fundamental system elements, the disclosure turns to the exemplary method embodiment. The method outlines a discriminative and automatic approach to pronunciation modeling for voice search. This approach is not only stochastic (data driven) and requires little or no human intervention, but also maximizes an objective function which implicitly minimizes the recognition error rate. One basic idea behind this approach is to assign weights to units of speech and discriminatively adapt those weights to maximize a recognition objective function (or minimize, depending on the applicable objective function). For clarity, the method is discussed in terms of a system configured to practice the method. FIG. 2 illustrates an example method embodiment. The system receives speech utterances (202). Speech utterances can be related to names and can be part of a multimodal search. Utterances can be from diverse speakers and can contain diverse sets of words. One potential source of speech utterances related to names is a voice-enabled directory search such as a telephone-based yellow pages search for business names and city names. A multimodal search involves a spoken element and one or more additional elements such as keyboard, mouse, stylus, touch, visual, audible, taste, smell, temperature, etc.

The system assigns a pronunciation weight to each unit of speech in the speech utterances, each respective pronunciation weight being normalized at a unit of speech level to sum to 1 (204). A unit of speech can be a sentence, a word, a context-dependent phone, a context-independent phone, or a syllable. The system can normalize weights at a word level at a phone level, or even a sentence level. For example, assume that the English word <<creek>> is normalized at a word level. One potential context-dependent distribution of weights which sums to 1 is assigning the pronunciation <<kr ek>> a weight of 0.83 and the pronunciation <<krik>> a weight of 0.17. The system can normalize weights at a phone level for the vowel pair <<ee>> independent of any modifications to the remaining letters in the word.

Context-dependent weights depend on the surrounding units of speech. Context-dependence may extend beyond a single word. For example, 'contrary' is pronounced differently in the context of "on the contrary" (accent on 'con') and "Mary, Mary, quite contrary" (accent on 'a' to better rhyme with 'Mary'). In such situations, the phrase context influences the pronunciation weights of phones in the word 'contrary'.

The system optimizes the pronunciation weight for each received speech utterance (206) by first identifying word and phone alignments and corresponding likelihood scores (208), and second, discriminatively adapting pronunciation weight to minimize classification errors (210). An optional third step for optimizing the pronunciation weight computes an objective function to minimize classification errors, the objective function being a function to be optimized. A function F can represent an objective function, otherwise known as a cost function. A feasible solution that minimizes (or maximizes, if that is the goal) the objective function is called an optimal solution. The objective function can also be maximum mutual information (MMI), maximum likelihood (MLE) training, and minimum classification error (MCE) training, depending on the design goals for the system. The system can use other objective functions as well. The step of discriminatively adapting pronunciation weights can further include stochastically modeling pronunciations.

After performing these steps, the system is prepared to continue to receive speech with improved capabilities for interpreting pronunciations. The system recognizes additional received speech utterances using the optimized pronunciation weights (212). After the optimized weights are prepared, the system uses them to recognize speech. In one aspect, the correct pronunciation of a word is given a higher weight and "moves" up the stack of potential pronunciations in a manner similar to an N-best list.

Figure 3:
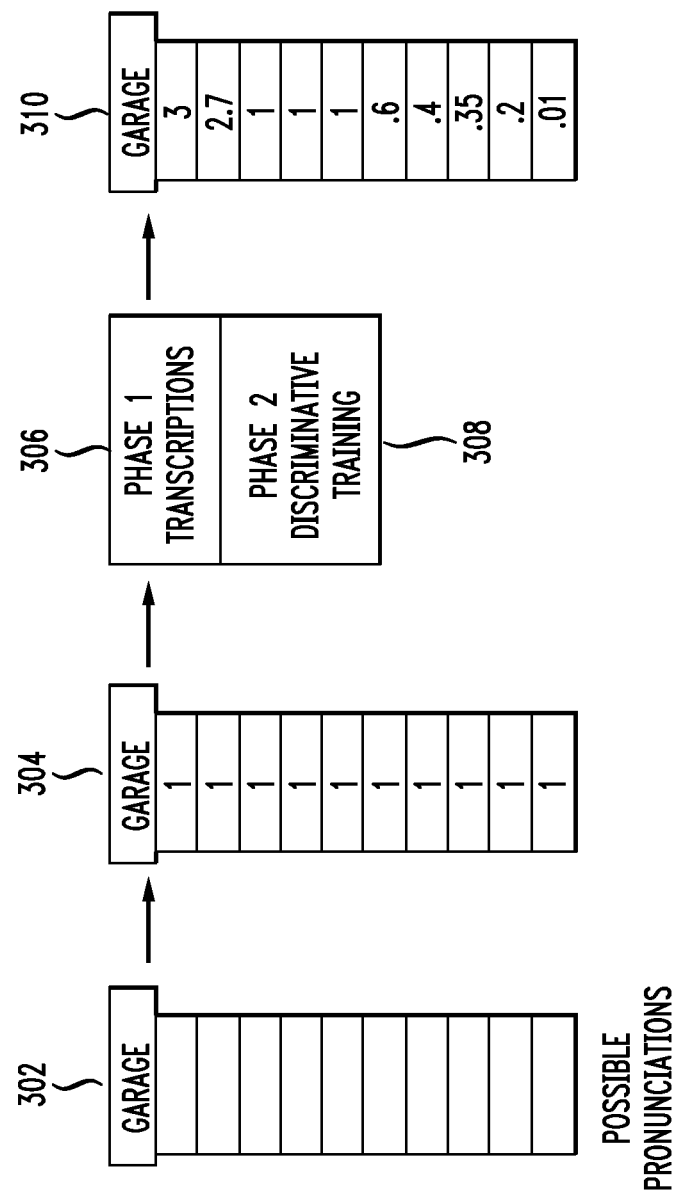
FIG. 3 illustrates a semi-supervised pronunciation modeling scenario.
Figure 4:
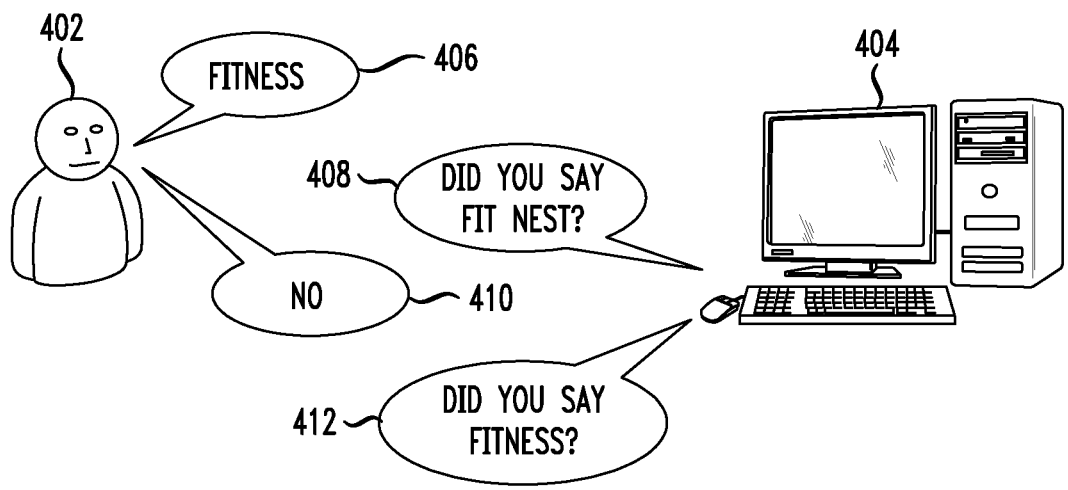
FIG. 4 illustrates an unsupervised pronunciation modeling scenario.
Figure 5:
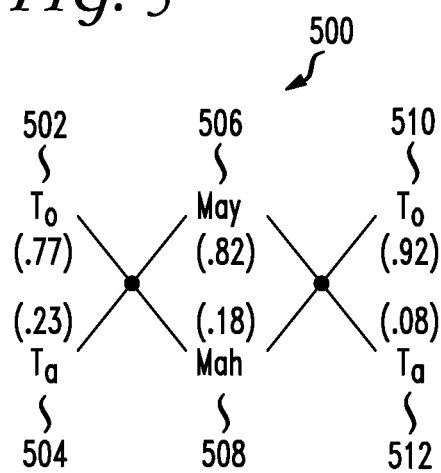
FIG. 5 illustrates an example of assigning probability at a phone level.

Three scenarios provide further variations which illustrate of the principles of the invention. The first scenario demonstrates semi-supervised pronunciation modeling as shown in FIG. 3. The second scenario demonstrates unsupervised pronunciation modeling as shown in FIG. 4. The third scenario demonstrates assigning probability at a phone and/or sentence level as shown in FIG. 5.

The first scenario demonstrates semi-supervised pronunciation modeling. During a training phase, the system determines that the word 'garage' has 10 different possible pronunciations 302. Known technology can expand a given word to possible pronunciations or a human speech expert can manually enter different pronunciations. The system assigns each identified pronunciation an equal weight of 1, meaning that each pronunciation is equally likely 304. The traditional system is completely supervised and includes two phases which each require human intervention. The first phase requires human transcription of recognized text 306. The second phase requires human pronunciation modeling of how recognized text was actually pronounced and how the recognizer expected it to be pronounced 308. This second phase can also include human intervention to modify recognizer pronunciation models.

The semi-supervised system includes the same two phases, but only the first phase requires human intervention. The second phase automatically applies discriminative training to reduce errors by changing pronunciations. Corrupt or incorrect transcriptions are one potential target for changing pronunciations. This phase can apply various algorithms to change means and variances of hidden Markov models (HMM) to minimize errors and increase speech recognition accuracy. Effectively, the system adjusts weights for units of speech up or down so the more likely correct pronunciations move up in the stack and the less likely correct pronunciations move down in the stack 310. After several iterations, the system produces a trained grammar ready for use with speech recognition.

The second scenario demonstrates unsupervised pronunciation modeling in contrast to the semi-supervised first scenario. The second scenario is essentially the same as the first scenario except that the first phase does not require human transcription of recognized text. Rather, the first phase incorporates feedback from a speaker of recognized speech. For example, a speaker 402, during a conversation with a dialog system 404, says the word "fitness" 406. The system 404 can present to the speaker all or part of an N-best list of recognition candidates such as "fit nest", "fitness", "filthyness", "witness", and "fullest". The user can select the correct recognition candidate. Or, if the speaker does not have access to a display to view and select from a list of recognition candidates, the system can repeat a recognition candidate to the speaker and ask for approval, such as "Did you say 'fit nest'?" 408. The user answers "no" 410. Then the system 404 selects and repeats another candidate 412 until the speaker approves of the selected recognition candidate. This feedback from a user or speaker tells the system a level of correctness certainty of an action or selection. The system can use only those recognition candidates that feedback has previously indicated as correct.

The third scenario demonstrates assigning probability at a phone and/or sentence level. The system can blend this third scenario with the first and/or second scenarios. In the third scenario, the system assigns probabilities or weights for each pronunciation per phone. For example, the word 'tomato' can be pronounced many different ways, represented in units of speech as (to,ta/may,mah/to,ta) as shown in FIG. 5. The system assigns each phone a different weight. With these variations, the system assigns weights to the first phones 'to' 502 and 'ta' 504 based on recognized speech for each variation. The system can assign different weights to the phones 'may' 506 and 'mah' 508 in the context of the word 'tomato'. The same for the final phones 510, 512 in the word 'tomato'. As the system trains a speech recognition grammar, the system tunes the phone weights to reflect recognized speech. For example, the system can assign 'may' a weight of 0.82 and 'mah' a weight of 0.18 in the context of 'tomato'. One possible way to derive these weights is to base them on the how often the system encounters a phone in that context. For example, the system can assign 'may' a weight of 0.82 because it encountered 'may' 82 percent of the time in the context of 'tomato'. While this example is context-dependent at a word level, weights for phones can also be context-dependent at a phone sequence level, phrase level, sentence level or at an even higher level.

The method and scenarios above describe a systematic way to decrease error rate for pronunciation modeling with minimal human supervision or completely without human supervision. One goal is to minimize errors, not necessarily completely reduce errors. The principles described here are application independent and can be very broadly integrated to nearly any speech recognition application.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to pronunciation modeling in nearly any context. Those skilled in the art will readily recognize various modifications and changes that may be made to the present invention without following the example embodiments and applications illustrated and described herein, and without departing from the true spirit and scope of the present invention.

We claim:

1. A method comprising:
   determining a context associated with an utterance received via a microphone that converts audible signals into electrical signals;
   determining, via a processor, phoneme possibilities for a unit of speech in the utterance;
   assigning weights to each phoneme possibility in the phoneme possibilities, to yield weighted phonemes, wherein the weights are based on a rate of occurrence of the phoneme possibility in utterances associated with the context and a likelihood of classification errors;
   receiving additional utterances via the microphone; and
   converting the additional utterances into text via a speech recognizer that uses the weighted phonemes.

2. The method of claim 1, further comprising:
   comparing the weighted phonemes to stored weighted phonemes, to yield a comparison value; and
   determining a recognition response based on the comparison value.

3. The method of claim 1, further comprising:
   comparing the weighted phonemes to stored weighted phonemes, to yield a comparison value; and
   when the comparison value is above a threshold value, modifying the stored weighted phonemes based on the weighted phonemes.

4. The method of claim 1, wherein the unit of speech is one of a syllable, a word, a sentence, a context-dependent phone, and a context-independent phone.

5. The method of claim 1, further comprising:
   prior to recognizing of the additional utterances, discriminatively adapting the weighted phonemes to minimize classification errors.

6. The method of claim 5, wherein discriminatively adapting the weighted phonemes further comprises stochastically modeling pronunciations.

7. The method of claim 1, wherein the weights assigned to the phoneme possibilities of the unit of speech are normalized to sum to 1.

8. The method of claim 1, wherein the utterance comprises a name.

9. The method of claim 1, wherein the utterance is part of a multimodal input.

10. A system comprising:
    a processor; and
    a computer-readable storage medium having instructions stored which, when executed by the processor, cause the processor to perform operations comprising:
        determining a context associated with an utterance received via a microphone that converts audible signals into electrical signals;
        determining, via a processor, phoneme possibilities for a unit of speech in the utterance;
        assigning weights to each phoneme possibility in the phoneme possibilities, to yield weighted phonemes, wherein the weights are based on a rate of occurrence of the phoneme possibility in utterances associated with the context and a likelihood of classification errors;
        receiving additional utterances via the microphone; and
        converting the additional utterances into text via a speech recognizer that uses the weighted phonemes.

11. The system of claim 10, the computer-readable storage medium having additional instructions stored which, when executed by the processor, result in the processor performing operations comprising:
    comparing the weighted phonemes to stored weighted phonemes, to yield a comparison value; and
    determining a recognition response based on the comparison value.

12. The system of claim 10, the computer-readable storage medium having additional instructions stored which, when executed by the processor, result in processor performing operations comprising:
    comparing the weighted phonemes to stored weighted phonemes, to yield a comparison value; and
    when the comparison value is above a threshold value, modifying the stored weighted phonemes based on the weighted phonemes.

13. The system of claim 10, wherein the unit of speech is one of a syllable, a word, a sentence, a context-dependent phone, and a context-independent phone.

14. The system of claim 10, the computer-readable storage medium having additional instructions stored which, when executed by the processor, result in the processor performing operations comprising:
    prior to recognizing additional utterances, discriminatively adapting the weighted phoneme to minimize classification errors.

15. The system of claim 14, wherein discriminatively adapting the weighted phonemes further comprises stochastically modeling pronunciations.

16. A non-transitory computer-readable storage device having instructions stored which, when executed by a computing device, cause the computing device to perform operations comprising:
- determining a context associated with an utterance received via a microphone that converts audible signals into electrical signals;
- determining, via a processor, phoneme possibilities for a unit of speech in the utterance;
- assigning weights to each phoneme possibility in the phoneme possibilities, to yield weighted phonemes, wherein the weights are based on a rate of occurrence of the phoneme possibility in utterances associated with the context and a likelihood of classification errors;
- receiving additional utterances via the microphone; and
- converting the additional utterances into text via a speech recognizer that uses the weighted phonemes.

17. A non-transitory computer-readable storage device of claim 16, having additional instructions stored which, when executed by the computing device, result in the computing device performing operations comprising:
- comparing the weighted phonemes to stored weighted phonemes, to yield a comparison value; and
- determining a recognition response based on the comparison value.

18. A non-transitory computer-readable storage device of claim 16, having additional instructions stored which, when executed by the computing device, result in the computing device performing operations comprising:
- comparing the weighted phonemes to stored weighted phonemes, to yield a comparison value; and
- when the comparison value is above a threshold value, modifying the stored weighted phoneme based on the weighted phonemes.

19. A non-transitory computer-readable storage device of claim 16, wherein the unit of speech is one of a syllable, a word, a sentence, a context-dependent phone, and a context-independent phone.

20. A non-transitory computer-readable storage device of claim 16, having additional instructions stored which, when executed by the computing device, result in the computing device performing operations comprising:
- prior to recognizing additional utterances, discriminatively adapting the weighted phonemes to minimize classification errors.

\* \* \* \* \*